(12) United States Patent
Mauge' et al.

(10) Patent No.: US 8,949,265 B2
(45) Date of Patent: Feb. 3, 2015

(54) SYSTEM AND METHOD TO PROVIDE QUERY LINGUISTIC SERVICE

(75) Inventors: Karin Mauge', Los Altos, CA (US); Radoslav Valentinov Petranov, Framingham, MA (US); Jean-David Ruvini, Los Gatos, CA (US); Antoniya T. Statelova, Worcester, MA (US); Neelakantan Sundaresan, Mountain View, CA (US)

(73) Assignee: eBay Inc., San Jose, CA (US)

( * ) Notice: Subject to any disclaimer, the term of this patent is extended or adjusted under 35 U.S.C. 154(b) by 459 days.

(21) Appl. No.: 12/718,929

(22) Filed: Mar. 5, 2010

(65) Prior Publication Data

US 2010/0228762 A1    Sep. 9, 2010

Related U.S. Application Data

(60) Provisional application No. 61/157,867, filed on Mar. 5, 2009.

(51) Int. Cl.
*G06F 17/30* (2006.01)

(52) U.S. Cl.
CPC .................... *G06F 17/30672* (2013.01)
USPC .......................... 707/766; 707/767

(58) Field of Classification Search
CPC .................... G06F 17/3067; G06F 17/3064
USPC .................. 707/771, E17.015, E17.072, 766
See application file for complete search history.

(56) References Cited

U.S. PATENT DOCUMENTS

| | | | | |
|---|---|---|---|---|
| 5,488,725 A | * | 1/1996 | Turtle et al. | 1/1 |
| 5,978,785 A | * | 11/1999 | Johnson et al. | 706/54 |
| 6,081,798 A | * | 6/2000 | Johnson et al. | 706/54 |
| 6,996,520 B2 | * | 2/2006 | Levin | 704/10 |
| 2001/0044758 A1 | * | 11/2001 | Talib et al. | 705/27 |
| 2002/0052894 A1 | * | 5/2002 | Bourdoncle et al. | 707/513 |
| 2002/0091835 A1 | * | 7/2002 | Lentini et al. | 709/227 |
| 2002/0129054 A1 | * | 9/2002 | Ferguson et al. | 707/503 |
| 2002/0143744 A1 | * | 10/2002 | Teng et al. | 707/2 |
| 2002/0147724 A1 | * | 10/2002 | Fries et al. | 707/100 |
| 2003/0061200 A1 | * | 3/2003 | Hubert et al. | 707/3 |
| 2003/0088553 A1 | * | 5/2003 | Monteverde | 707/3 |
| 2003/0187837 A1 | * | 10/2003 | Culliss | 707/3 |
| 2004/0002849 A1 | * | 1/2004 | Zhou | 704/4 |
| 2004/0122656 A1 | * | 6/2004 | Abir | 704/4 |
| 2004/0153343 A1 | * | 8/2004 | Gotlib et al. | 705/3 |
| 2004/0158559 A1 | * | 8/2004 | Poltorak | 707/3 |
| 2005/0131886 A1 | * | 6/2005 | Ejerhed et al. | 707/3 |
| 2005/0154708 A1 | * | 7/2005 | Sun | 707/3 |

(Continued)

OTHER PUBLICATIONS

Slawski, Bill, "How a Search Engine Might Find Synonyms to Use to Expand Search Queries", www.seobythesea.com, (Dec. 29, 2008), 8 pgs.

*Primary Examiner* — Syed Hasan
(74) *Attorney, Agent, or Firm* — Schwegman Lundberg & Woessner, P.A.

(57) ABSTRACT

In various example embodiments, a system and method to provide query linguistic service is provided. An initial query term set is received. Phrase recognition is performed on the initial query term set to determine recognized phrases. Using the determined recognized phrases, one or more synonyms for each of the recognized phrases are determined. Results matching the initial query term set and any selected synonyms from the determined one or more synonyms are determined.

18 Claims, 10 Drawing Sheets

(56) References Cited

U.S. PATENT DOCUMENTS

| | | | |
|---|---|---|---|
| 2006/0161520 A1* | 7/2006 | Brewer et al. | 707/3 |
| 2006/0190447 A1* | 8/2006 | Harmon et al. | 707/4 |
| 2007/0078814 A1* | 4/2007 | Flowers et al. | 707/2 |
| 2007/0118512 A1* | 5/2007 | Riley et al. | 707/3 |
| 2007/0174299 A1* | 7/2007 | Kuang et al. | 707/10 |
| 2007/0203929 A1* | 8/2007 | Bolivar | 707/101 |
| 2007/0282811 A1* | 12/2007 | Musgrove | 707/3 |
| 2009/0070298 A1* | 3/2009 | Thione et al. | 707/3 |
| 2009/0077047 A1* | 3/2009 | Cooper et al. | 707/4 |
| 2009/0144262 A1* | 6/2009 | White et al. | 707/5 |

* cited by examiner

Tools

Enter Search: ☐

● Find phrases which match partially  (explain)
○ Find phrases which are exact matches  (explain)

[Find Phrase]

FIG. 6a

| dolce | and | gabbana |

|  | Show Options ☐ |
|---|---|
| Phrase | We also suggest |
| dolce and gabbana | ☑ dolce and gabbana<br>☐ d g<br>☐ dolceandgabbana<br>[Select All] [Deselect All] |

[Show Results]

FIG. 6c

Tools

Enter Search: [_____]

● Find phrases which match partially (explain)
○ Find phrases which are exact matches (explain)

[Find Phrase]

Select Category

○ No category selected.

└ ○ Clothing, Shoes & Accessories
   └ ○ Women's Accessories & Handbags
      └ ○ Handbags & Bags └ ○ Clothing, Shoes & Accessories
   └ ○ Men's Clothing
      └ ○ Shirts
         └ ○ T-Shirts, Tank Tops └ ○ Clothing, Shoes & Accessories
   └ ● Women's Clothing
      └ ○ T-Shirts & Tank Tops └ ○ Clothing, Shoes & Accessories
   └ ○ Women's Clothing
      └ ○ Dresses

[Select Category]

FIG. 6b

| dolce | and | gabbana | something | else | for | sake | of | example |

|  |  | ☐ Hide Options |
| --- | --- | --- |
| Phrase | We also suggest | Search for: (explain) |
| dolce and gabbana | ☑ dolce and gabbana<br>☐ d g<br>☐ dolceandgabbana<br>[Select All]<br>[Deselect All] | [Leave as is (default) ▼]<br>[Leave as is (default) ▼]<br>[Leave as is (default) ▼] |
| something else for sake of example | ☑ something else for sake of example<br>[Select All]<br>[Deselect All] | [Leave as is (default) ▼]<br>Leave as is (default)<br>Apply OR operator<br>Apply quotations |

[Show Results]

FIG. 6d

Tools

- Start New Search
- Edit Previous Search

Select all phrases to EXCLUDE from your search

| | |
|---|---|
| ☐ new | ☑ sunglasses |
| ☑ t-shirt | ☑ shades |
| ☐ d&g | ☐ black |
| ☐ ladies | ☐ size |
| ☐ music | ☐ men |
| ☐ white | ☐ women |
| ☐ shirt | ☐ short |
| ☑ zipper | ☐ 218 |
| ☐ brand | ☐ dress |
| ☑ glasses | ☐ vintage |

Refine Results

Results

7208 items found: (dolce and gabbana, d g, dolceandgabbana, d g, dolceandgabbana
Original query returned 6077 items Next Page

| | Item Title | Bids | Price* | |
|---|---|---|---|---|
| | SALE Black Short Sleeve D.G. Ladies | 0 | $14.99 | 41s |
| | New D G White Aviator Sunglasses | 0 | $12.99 | 41m 13s |
| | New D G Sunglasses Free Shipping | 0 | $9.99 | 2h 4m 18s |
| | 2009 Ladies D G Sunglasses Shades | 0 | $9.99 | 2h 5m 36s |
| | D & G High Heel Shoes Size 9 | 5 | $3.79 | 3h 28m 36s |
| | Dolce Gabbana D&G Black Sunglasses | 9 | $98.89 | 2d 7h 5m 1s |
| | New D&G Black Mesh Dress Skirt 40 | 0 | $1959 | 3h 59m 8s |

FIG. 6e

SYSTEM AND METHOD TO PROVIDE QUERY LINGUISTIC SERVICE

RELATED APPLICATIONS

The present application claims the priority benefit of U.S. Provisional Patent Application No. 61/157,867, filed Mar. 5, 2009 and entitled "Query Linguistic Service." The content of the aforementioned application is incorporated herein by reference.

FIELD

The present disclosure relates generally to searches, and in a specific example embodiment, to providing query linguistic service.

BACKGROUND

The amount of data stored on networked systems continues to grow and thus requiring more precise management of the data as well as more accurate searching mechanisms. Websites and search engines typically allow a user to search for content based on textual inputs. For example, keyword searches may be used to search one or more databases whereby the user specifies a number of terms that describe the desired information. The use of keyword searches, however, can be a very burdensome and inaccurate process. In some instances, the initial keywords may not return what the user needs or desires. This is caused by a number of reasons such as an inability of the user to accurately describe the information that he or she demands, existence of spelling mistakes, difference in vocabulary, and nuances in expressions by the various database contributors.

BRIEF DESCRIPTION OF DRAWINGS

Various ones of the appended drawings merely illustrate example embodiments of the present invention and cannot be considered as limiting its scope.

FIG. 6a-FIG. 6e are example screenshots illustrating the use of the query linguistic service.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

As used herein, the term "or" may be construed in either an inclusive or exclusive sense. Additionally, although various example embodiments discussed below focus on a network-based publication environment, the embodiments are given merely for clarity in disclosure. Thus, any type of electronic publication, electronic commerce, or electronic business system and method, including various system architectures, may employ various embodiments of the content system and method described herein and be considered as being within a scope of example embodiments. Each of a variety of example embodiments is discussed in detail below.

Example embodiments described herein provide systems and methods to provide a query linguistic service. An initial query term set is received. Phrase recognition is performed on the initial query term set to determine recognized phrases. Using the determined recognized phrases, one or more synonyms for each of the recognized phrases are determined. Results matching the initial query term set and any selected synonyms from the determined one or more synonyms are determined.

In further embodiments, a number of the results are analyzed to determine terms most frequently encountered in the number of the results. The most frequently encountered terms are presented to a user and the user may provide a refinement input based on the terms most frequently encountered. The results are refined using the refinement input. In one embodiment, the refinement input comprises one or more of the terms most frequently encountered to exclude when refining the results.

Figure 1:
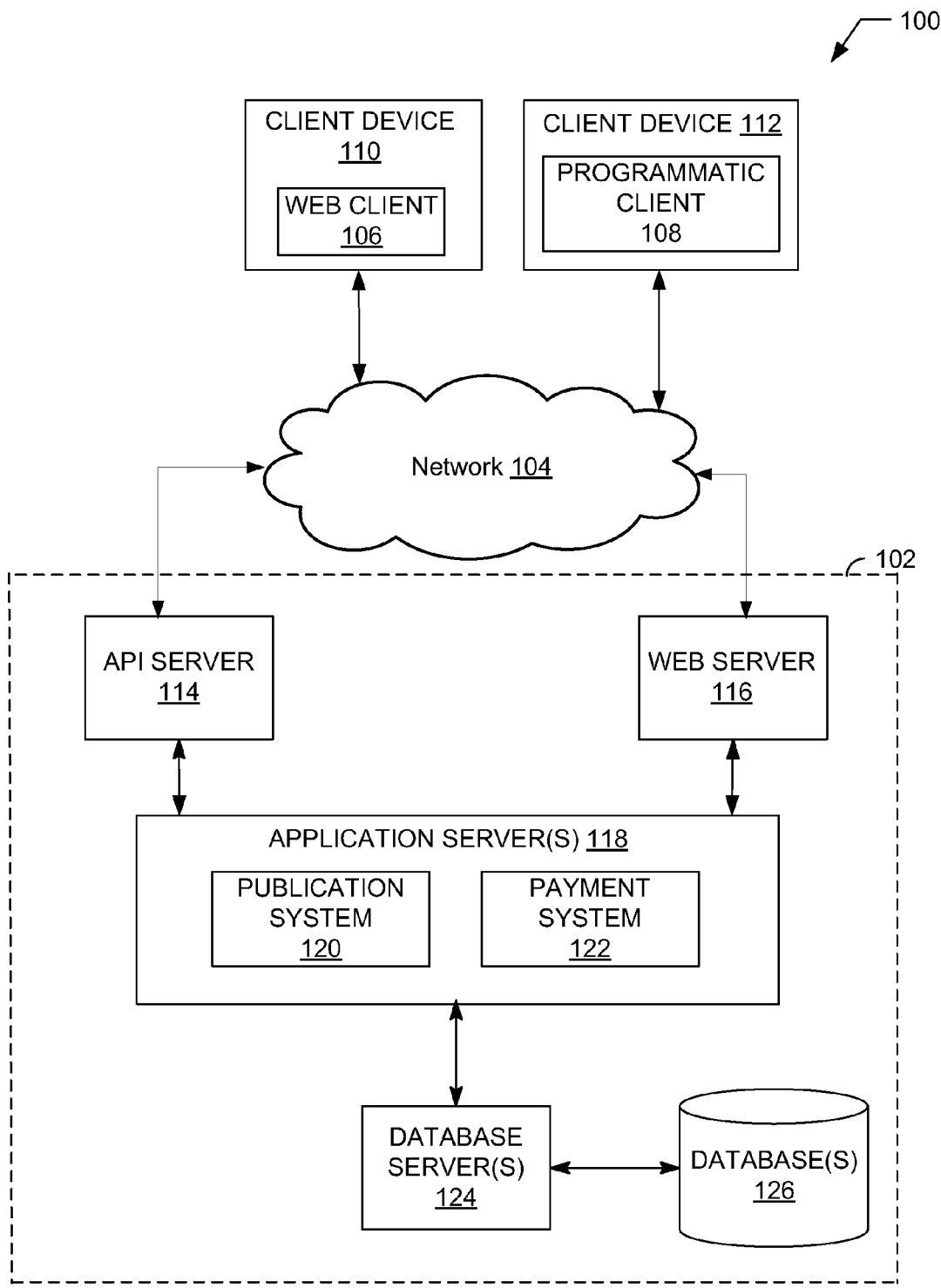
FIG. 1 is a block diagram illustrating an example embodiment of a network architecture of a system used to identify items depicted in images.

With reference to FIG. 1, an example embodiment of a high-level client-server-based network architecture 100 to provide results using a query linguistic service is shown. A networked system 102, in an example form of a network-server-side functionality, is coupled via a communication network 104 (e.g., the Internet or a Wide Area Network (WAN)) to one or more client devices 110 and 112. FIG. 1 illustrates, for example, a web client 106 operating via a browser (e.g., such as the INTERNET EXPLORER® browser developed by Microsoft® Corporation of Redmond, Wash. State), and a programmatic client 108 executing on respective client devices 110 and 112. The client devices 110 and 112 may comprise a mobile phone, desktop computer, laptop, or any other communication device that a user may utilize to access the networked system 102.

An Application Program Interface (API) server 114 and a web server 116 are coupled to, and provide programmatic and web interfaces respectively to, one or more application servers 118. The application servers 118 host a publication system 120 and a payment system 122, each of which may comprise one or more modules, applications, or engines, and each of which may be embodied as hardware, software, firmware, or any combination thereof. The application servers 118 are, in turn, coupled to one or more database servers 124 facilitating access to one or more information storage repositories or database(s) 126.

In example embodiments, the database 126 comprises a table which stores the information needed to facilitate the query linguistic service. The table includes three components: category, phrase, and synonyms. The category component may be an integer describing the item category in a publication database (e.g., the eBay listing database). The phrase component is one or more words merged together into a phrase. The synonyms component comprises a string that is made up of all the phrase synonyms separated by a delimiter (e.g., a comma). For example, the category may be "34968" which is associated with a phrase "brand new" and synonyms "brand new, brandnew." In another example, the category "23863" is associated with a phrase "handbag" having synonyms "purse, hand bag, handbag." In one embodiment, the table is stored in a MySQL database. Alternative embodiments may contemplate the use of hash tables or flat files.

The publication system 120 publishes content on a network (e.g., Internet). As such, the publication system 120 provides a number of publication and marketplace functions and services to users that access the networked system 102. The publication system 120 is discussed in more detail in connection with FIG. 2.

The payment system 122 provides a number of payment services and functions to users. The payment system 122 allows users to accumulate value (e.g., in a commercial currency, such as the U.S. dollar, or a proprietary currency, such as "points") in accounts, and then later to redeem the accumulated value for products (e.g., goods or services) that are made available via the publication system 120. The payment system 122 also facilitates payments from a payment mechanism (e.g., a bank account or credit card) for purchases of items via the network-based marketplace. While the publication system 120 and the payment system 122 are shown in FIG. 1 to both form part of the networked system 102, it will be appreciated that, in alternative embodiments, the payment system 122 may form part of a payment service that is separate and distinct from the networked system 102.

While the example network architecture 100 of FIG. 1 employs a client-server architecture, a skilled artisan will recognize that the present disclosure is not limited to such an architecture. The example network architecture 100 can equally well find application in, for example, a distributed or peer-to-peer architecture system. The publication system 120 and payment system 122 may also be implemented as standalone systems or standalone software programs operating under separate hardware platforms, which do not necessarily have networking capabilities.

Figure 2:
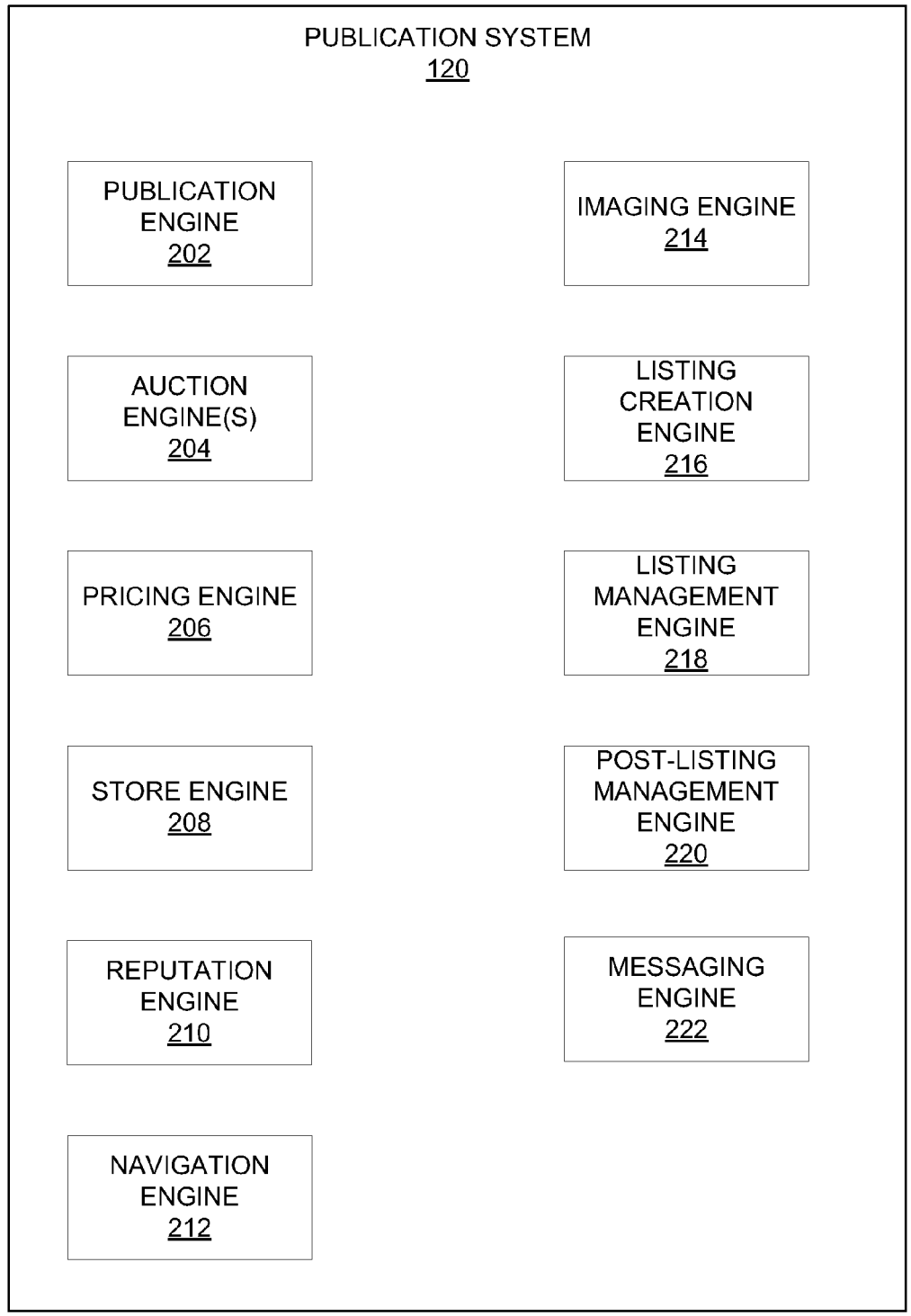
FIG. 2 is a block diagram illustrating an example embodiment of a publication system.

Referring now to FIG. 2, an example block diagram illustrating multiple components that, in one example embodiment, are provided within the publication system 120 of the networked system 102 (see FIG. 1) is shown. The publication system 120 may be hosted on dedicated or shared server machines (not shown) that are communicatively coupled to enable communications between the server machines. The multiple components themselves are communicatively coupled (e.g., via appropriate interfaces), either directly or indirectly, to each other and to various data sources, to allow information to be passed between the components or to allow the components to share and access common data. Furthermore, the components may access the one or more database(s) 126 via the one or more database servers 124, both shown in FIG. 1.

In one embodiment, the publication system 120 provides a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the publication system 120 may comprise at least one publication engine 202 and one or more auction engines 204 that support auction-format listing and price setting mechanisms (e.g., English, Dutch, Chinese, Double, Reverse auctions, etc.). The various auction engines 204 also provide a number of features in support of these auction-format listings, such as a reserve price feature whereby a seller may specify a reserve price in connection with a listing and a proxy-bidding feature whereby a bidder may invoke automated proxy bidding.

In other embodiments, the publication system 120 is directed to providing general information to a user. In these embodiments, the publication system may comprise a collection of websites and associated data repositories. For simplicity, the description of example embodiments is presented with reference to a networked marketplace. However, it will be understood that embodiments may be applicable to a non-marketplace environment. As such, not all components of the publication system 120, as described herein, may be necessary.

A pricing engine 206 supports various price listing formats. One such format is a fixed-price listing format (e.g., the traditional classified advertisement-type listing or a catalog listing). Another format comprises a buyout-type listing. Buyout-type listings (e.g., the Buy-It-Now (BIN) technology developed by eBay Inc., of San Jose, Calif.) may be offered in conjunction with auction-format listings and allow a buyer to purchase goods or services, which are also being offered for sale via an auction, for a fixed price that is typically higher than a starting price of an auction for an item.

A store engine 208 allows a seller to group listings within a "virtual" store, which may be branded and otherwise personalized by and for the seller. Such a virtual store may also offer promotions, incentives, and features that are specific and personalized to the seller. In one example, the seller may offer a plurality of items as Buy-It-Now items in the virtual store, offer a plurality of items for auction, or a combination of both.

A reputation engine 210 allows users that transact, utilizing the networked system 102, to establish, build, and maintain reputations. These reputations may be made available and published to potential trading partners. Because the publication system 120 supports person-to-person trading between unknown entities, users may otherwise have no history or other reference information whereby the trustworthiness and credibility of potential trading partners may be assessed. The reputation engine 210 allows a user, for example through feedback provided by one or more other transaction partners, to establish a reputation within the network-based publication system over time. Other potential trading partners may then reference the reputation for purposes of assessing credibility and trustworthiness.

Navigation of the network-based publication system may be facilitated by a navigation engine 212. For example, the navigation engine 212 enables keyword searches of listings published via the publication system 120. In a further example, a browse module (not shown) of the navigation engine 212 allows users to browse various category, catalog, or inventory data structures according to which listings may be classified within the publication system 120. Various other navigation applications within the navigation engine 212 may be provided to supplement the searching and browsing applications. The navigation engine 212 will be discussed in more detail in FIG. 3.

In order to make listings available via the networked system 102 as visually informing and attractive as possible, the publication system 120 may include an imaging engine 214 that enables users to upload images for inclusion within listings and to incorporate images within viewed listings. The imaging engine 214 may also facilitate the use of images in searching listings in conjunction with the navigation engine 212.

A listing creation engine 216 allows sellers to conveniently author listings of items or content. In one embodiment, the listings pertain to goods or services that a user (e.g., a seller) wishes to transact via the publication system 120. In other embodiments, a user may create a listing that is an advertisement or other form of content publication.

A listing management engine 218 allows sellers to manage such listings or publications. Specifically, where a particular seller or content provider has authored or published a large number of listings, the management of such listings may present a challenge. The listing management engine 218 provides a number of features (e.g., auto-relisting, inventory level monitors, etc.) to assist the seller or content provider in managing such listings.

A post-listing management engine 220 also assists sellers with a number of activities that typically occur post-listing. For example, upon completion of an auction facilitated by the one or more auction engines 204, a seller may wish to leave feedback regarding a particular buyer. To this end, the post-listing management engine 220 provides an interface to the reputation engine 210 allowing the seller to conveniently provide feedback regarding multiple buyers to the reputation engine 210.

A messaging engine 222 is responsible for the generation and delivery of messages to users of the networked system 102. Such messages include, for example, advising users regarding the status of listings and best offers (e.g., providing an acceptance notice to a buyer who made a best offer to a seller). The messaging engine 222 may utilize any one of a number of message delivery networks and platforms to deliver messages to users. For example, the messaging engine 222 may deliver electronic mail (e-mail), an instant message (IM), a Short Message Service (SMS), text, facsimile, or voice (e.g., Voice over IP (VoIP)) messages via wired networks (e.g., the Internet), a Plain Old Telephone Service (POTS) network, or wireless networks (e.g., mobile, cellular, WiFi, WiMAX).

Although the various components of the publication system 120 have been defined in terms of a variety of individual modules and engines, a skilled artisan will recognize that many of the items can be combined or organized in other ways. Furthermore, not all components of the publication system 120 have been included in FIG. 2. In general, components, protocols, structures, and techniques not directly related to functions of example embodiments (e.g., dispute resolution engine, loyalty promotion engine, personalization engines, etc.) have not been shown or discussed in detail. The description given herein simply provides a variety of example embodiments to aid the reader in an understanding of the systems and methods used herein.

Figure 3:
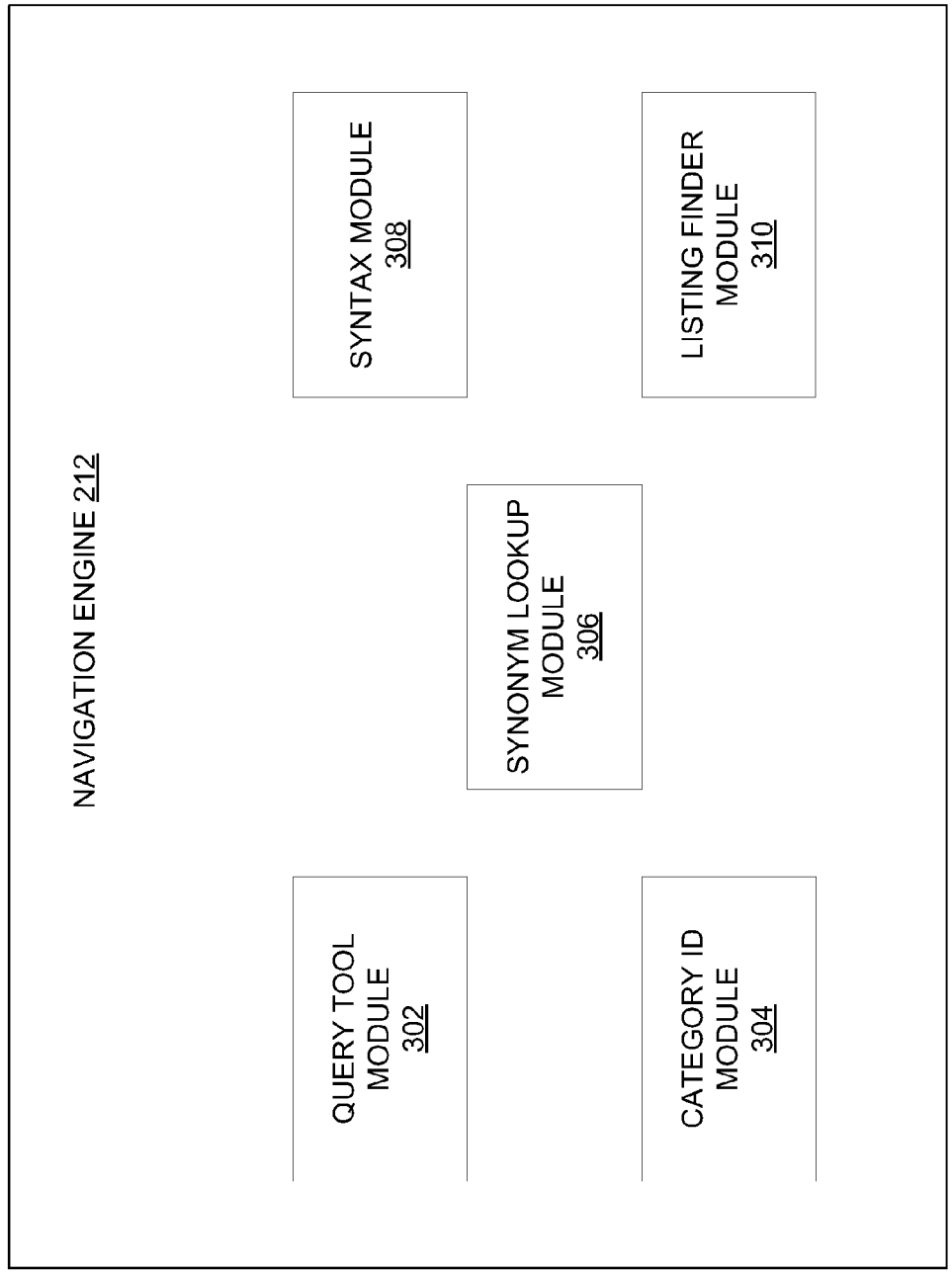
FIG. 3 is a block diagram illustrating an example embodiment of a navigation engine.

Application of Embodiments of the Query Linguistic Service Platform into the Example Network Architecture Referring now to FIG. 3, an example detailed diagram of components of the navigation engine 212 used in facilitating the query linguistic service are shown. In example embodiments, the navigation engine 212 comprises a query tool module 302, a category ID module 304, a synonym lookup module 306, a syntax module 308, and a listing finder module 310. It should be noted that the navigation engine 212 may comprise other components not shown that are not directed to the query linguistic service.

The query tool module 302 provides a graphical user interface through which information may be displayed to the user and user inputs may be received by the navigation engine 212. The user inputs include an initial query term set (e.g., set of keywords), category selections, modifications, and refinement inputs as will be described further herein. Example screenshots of the graphical user interface are described in more detail in connection with FIG. 6a-FIG. 6e.

The category identification (ID) module 304 determines an appropriate set of categories related to the initial query term set. In developing the category ID entries in the table, text files containing queries made in predetermined time period (e.g., past year) are analyzed. A categories ID's relevance is evaluated by a number that represents a number of times the specific category ID is viewed each time a query is performed thus resulting in an appropriate confidence level. A top number of categories (e.g., top four) is then stored for each category ID in the table stored at the database 126. Using the received initial query term set, a match for the entire query is first performed. If a match exists, then entire trees of the top number of categories are returned from which the user may choose a category selection.

If an exact match of the entire query is not present, a last word in the query is removed and another match attempt is performed. This process is repeated until a match is found. For example, for a query "shoes dolce and gabbana 8," the "8" is removed and a match for "shoes dolce and gabbana" is performed. If a match still is not found after all but one word is eliminated, then the category ID module 304 repeats the removal and match attempt process by eliminating the first word in the query and subsequently removing words from the end to front until a match is found. Other variations of the removal and match process may also be used.

The synonym lookup module 306 determines recognizable phrases in the query in order to find synonyms for these phrases in the selected categories. Several different methods for phrase recognition may be used by the synonym lookup module 306. In one method, words are added to a blank phrase until a matching phrase is found. The matching phrase is then removed and the process is repeated for the remainder of the query string. This method is efficient when a known phrase contains few words and do not have similar words.

For example, assume a list of synonyms for keyword1 includes keyword5 and a list of synonyms for "keyword2 keyword3" as a phrase includes keyword6 in the table. Further assume that the query received is "keyword1 keyword2 keyword3 keyword4." Using the first method, keyword1 is checked to see if it is at the beginning of any phrases. Since keyword1 is found as a beginning of a phrase (e.g., keyword1 having a list of synonyms including keyword5), a next keyword (e.g., keyword2) is added to the phrase (e.g., resulting in "keyword1 keyword2") and a determination made if the new phrase is in the table. Since the new phrase is not in the table, keyword2 is removed and it is noted that keyword1 and its synonym keyword5 is found. A new phrase is started using keyword2 and the process is repeated (e.g., "keyword2 keyword3" is looked up in the table). Because "keyword2 keyword3" exists, then the next keyword is added and a new lookup is performed (e.g., on "keyword2 keyword3 keyword4"). Since no match is found, keyword4 is removed and "keyword 2 keyword3" is noted as a phrase. Keyword4 is considered and since it has no synonyms, it is added as a phrase by itself. All these steps result in the correct phrase separation of the query into keyword1, "keyword2 keyword3", and keyword4.

A second method for phrase recognition starts with the whole query string and removes words one by one until a matching phrase is found. The process may be repeated with the remaining words which are not associated with a phrase yet. This method is efficient for phrases found in query strings containing a large number of words.

Thus for the example query of "keyword1 keyword2 keyword3 keyword4," a lookup of the entire query string is first performed. Since the entire query string does not exist, the last word is removed. A new lookup based on the remaining phrase "keyword1 keyword2 keyword3" is performed. The process continues until a phrase does exist (e.g., keyword1). Once the existing phrase is found, the existing phrase is removed from the query string and the process is repeated with the remaining query string (e.g., "keyword2 keyword3 keyword4"). In the present example, "keyword2 keyword3" will be recognized as a phrase having synonyms resulting in keyword4 being a single word that also gets added to the list of phrases.

In a third method for phrase recognition, a window of n words exists and the synonym lookup module 306 checks if the window of n words constitutes a single phrase. If the words in the window are not recognized as a phrase, a last word is removed from the window. This removal process continues until a phrase is recognized.

Using the same query example and a window of two word length, the first two words are considered to determine if they form a phrase (e.g., "keyword1 keyword2"). Since they do not, keyword2 is removed and keyword1 is added to a list of phrases. The next two words in the query are then considered (e.g., "keyword2 keyword3"). Since the next two words are recognized as a phrase, they get added to the list of phrases. Because keyword4 is the only word remaining, it gets considered by itself and even if not recognized, gets added to the list of phrases.

The lookup results may be returned in a JavaScript Object Notation (JSON) format of phrases found and their synonyms. Alternatively, the phrases found along with the most common phrases that can replace the phrases found may be returned. For example, if a set of synonyms for "Dolce and Gabbana" include "D&G" and "Dolce&Gabbana," then if any of these phrases are recognized in a search string, the value of their generalization will be "Dolce and Gabanna," since it is the most commonly used phrase for expressing the idea.

It should be noted that in some embodiments, the entire query string may be considered as a single string and only one lookup is performed to obtain synonyms. These embodiments do not require phrase recognition.

The syntax module 308 allows application of advanced query syntax to each phrase synonym returned by the synonym lookup module 306. The advanced syntax options comprise: leave as is (default), apply OR, apply quotations, and apply asterisks. The leave as is (default) option treats each word in the query normally with no advanced syntax applied thus resulting in the return of listings that match all words in the phrases in any order. The apply OR option uses a parentheses syntax which tells the API that any listing containing any of the words in the phrase is a good match. The apply quotations option is a quotation mark syntax that may be useful for titles, names, or anything else where the order of the words is important. The apply asterisk option results in the return of listings that contain any word that begins with the selected phrase. It should be noted that the syntax module 308 is optional.

The listing finder module 310 uses the initial query, determined synonyms, and any advanced syntax to determine the listings or content that match. The listing finder module 310 further analyzes a top number of results (e.g., listings or content) and determines a top number of words most frequently encountered in the results.

A user may refine their search by selecting words from the top number of words that the user wants to exclude from the results. The listing finder module 310 then repeats the process to determine new results and top number of words most frequently encountered.

Figure 4:
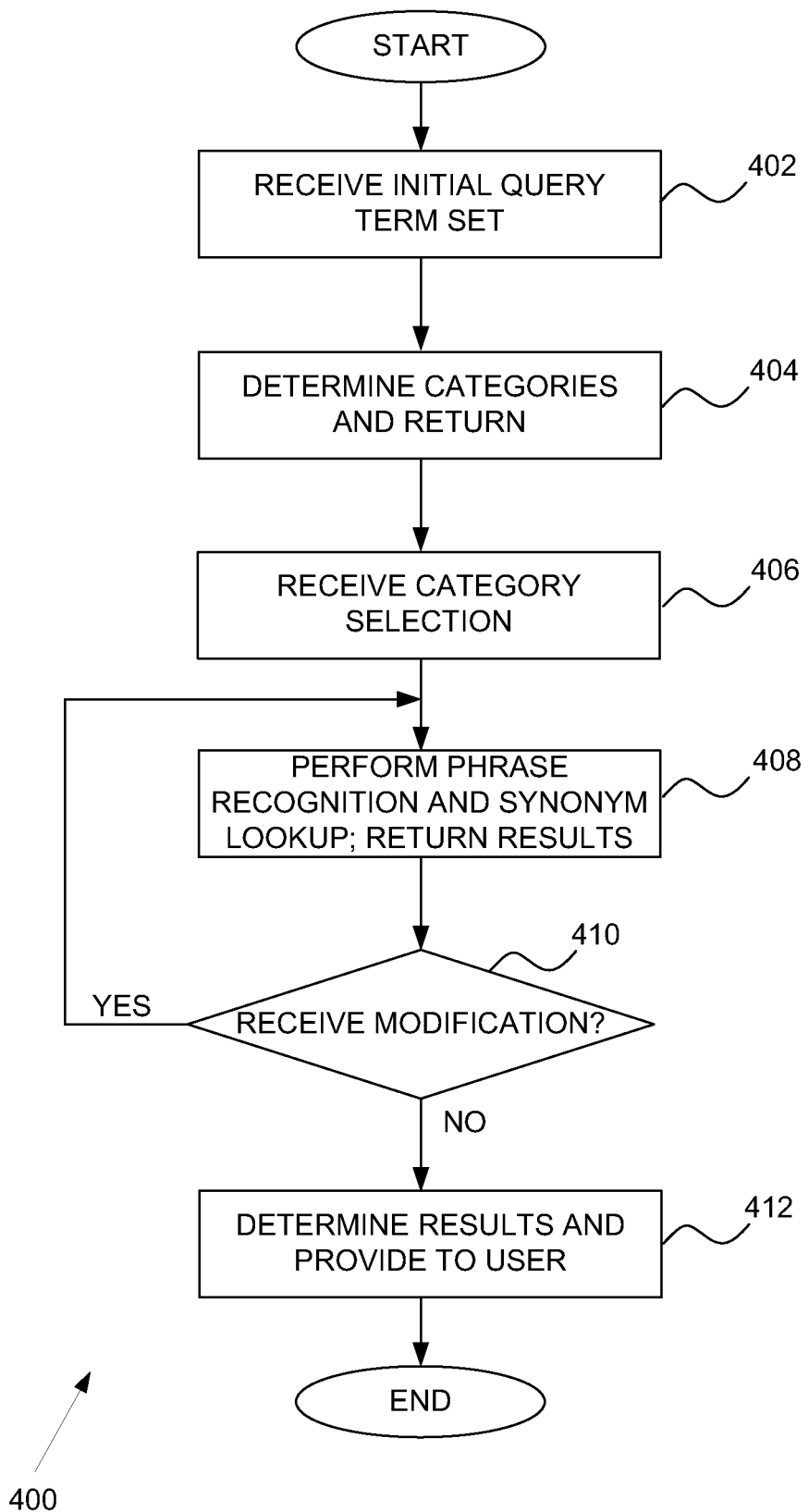
FIG. 4 is a flow diagram of an example high-level method for providing query linguistic service.

FIG. 4 is a flow diagram of an example high-level method 400 for providing query linguistic service. In operation 402, an initial query term set is received. In example embodiments, the initial query term set is received via the query tool module 302, which provides a graphical user interface for exchange of information.

A list of top categories is determined based on the initial query term set in operation 404. The category ID module 304 determines the appropriate set of top categories (e.g., top four categories) and entire trees of the top number of categories are returned from which the user may choose a category selection. In operation 406, the category selection is received via the query tool module 302.

In operation 408, phrase recognition and synonym lookup is performed and the results returned. In example embodiments, the synonym lookup module 306 determines recognizable phrases in the initial query term set in order to find synonyms for these phrases in the selected categories. Any number of different methods may be used to determine the synonyms as discussed above.

If a modification to the initial query term set is received in operation 410, then a new phrase recognition and synonym lookup process is performed. In some embodiments, the modification may include advanced query syntax inputs. If no modification is received, then at operation 412, results are determined and provided to the user. Operation 412 is discussed in more detail in connection with FIG. 5 below.

Figure 5:
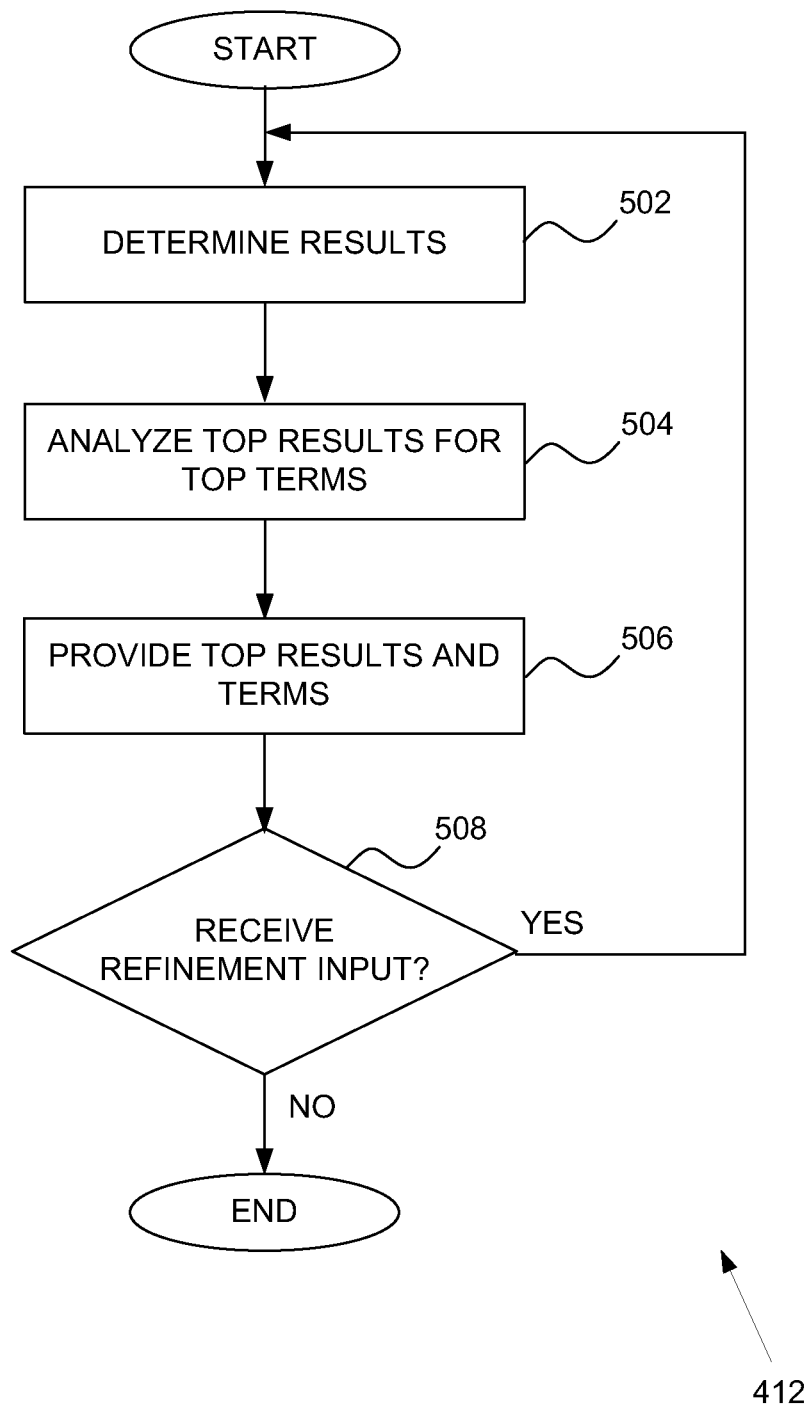
FIG. 5 is a flow diagram of an example detailed method for determining results based on the query linguistic service.

FIG. 5 is a flow diagram of an example detailed method (e.g., operation 412) for determining results based on the query linguistic service. The operations of the method of FIG. 5 may be performed by the listing finder module 310. In operation 502, results (e.g., listings or content) based on the initial query, determined synonyms, and any advanced syntax are determined.

A selection of top results (e.g., the top 40 results) are analyzed in operation 504 to determine a top number of words or terms most frequently encountered in the top results. The results and top terms are presented to the user in operation 506.

A determination is made in operation 508 whether a refinement input is received. If a user decides to refine their search by selecting words from the top number of words that the user wants to exclude from the results, the listing finder module 310 returns to operation 502 and repeats the process to determine new results and top number of words most frequently encountered.

FIG. 6a-FIG. 6e are example screenshots illustrating the use of the query linguistic service. FIG. 6a shows a graphical user interface through which a user may enter an initial query term set. The user may also select whether to find phrases which partially match or exactly match the initial query term set. For example, the user may enter the initial query term set "dolce and gabbana" and select to find phrases which partially match.

Once the user selects the "find phrases" button, the category ID module 304 analyzes the initial query term set and returns a top number of most commonly viewed categories corresponding to the initial query term set. The example graphical user interface depicted in FIG. 6b shows the top four categories for "dolce and gabbana." In one embodiment, an entire category tree is returned as shown. By returning the entire category tree, chances are improved that the user will select a category that fits their needs. In the present example, "Women's Clothing" under "Clothing, Shoes & Accessories" is selected as the category selection.

Once the category is selected, the synonym lookup module 306 parses the initial query term set and determine all phrases and all available synonyms for each phrase. FIG. 6c shows a simple graphical user interface informing the user of the phrases and synonyms for "dolce and gabbana." The user may modify the list of phrases by selecting the phrases and synonyms that the user would like to include in their search. If a modification is made, the graphical user interface is updated with the new list of phrases and their synonyms. In some embodiments, the user may have an option to incorporate advanced query syntax into their query. An updated graphical user interface having the advanced query syntax option is shown in FIG. 6d.

Once the user selects all the phrases, synonyms, and syntax of interest, the user may select the "show results" button and obtain the results. In one embodiment, the results are displayed on a right side of a graphical user interface as depicted in FIG. 6e. Furthermore, an analysis of the first set of listings or results (e.g., top 50 listings) is performed to determine a number of times each word is encountered. Since the results are likely sorted by best match, it is likely that the best results are being analyzed. The graphical user interface presents a top number of most frequently encountered words on a left side. The user is provided an option to mark the most frequently encountered words that the user would like to exclude from their query. For example, the user selects to exclude t-shirt, zipper, glasses, sunglasses, and shades from the results. Once the selection is made and the "refine results" button is clicked, the process is repeated resulting in a new result set. The user may refine the query as many times as the user desires to narrow the result set.

Modules, Components, and Logic

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Example Machine Architecture and Machine-Readable Medium

Figure 7:
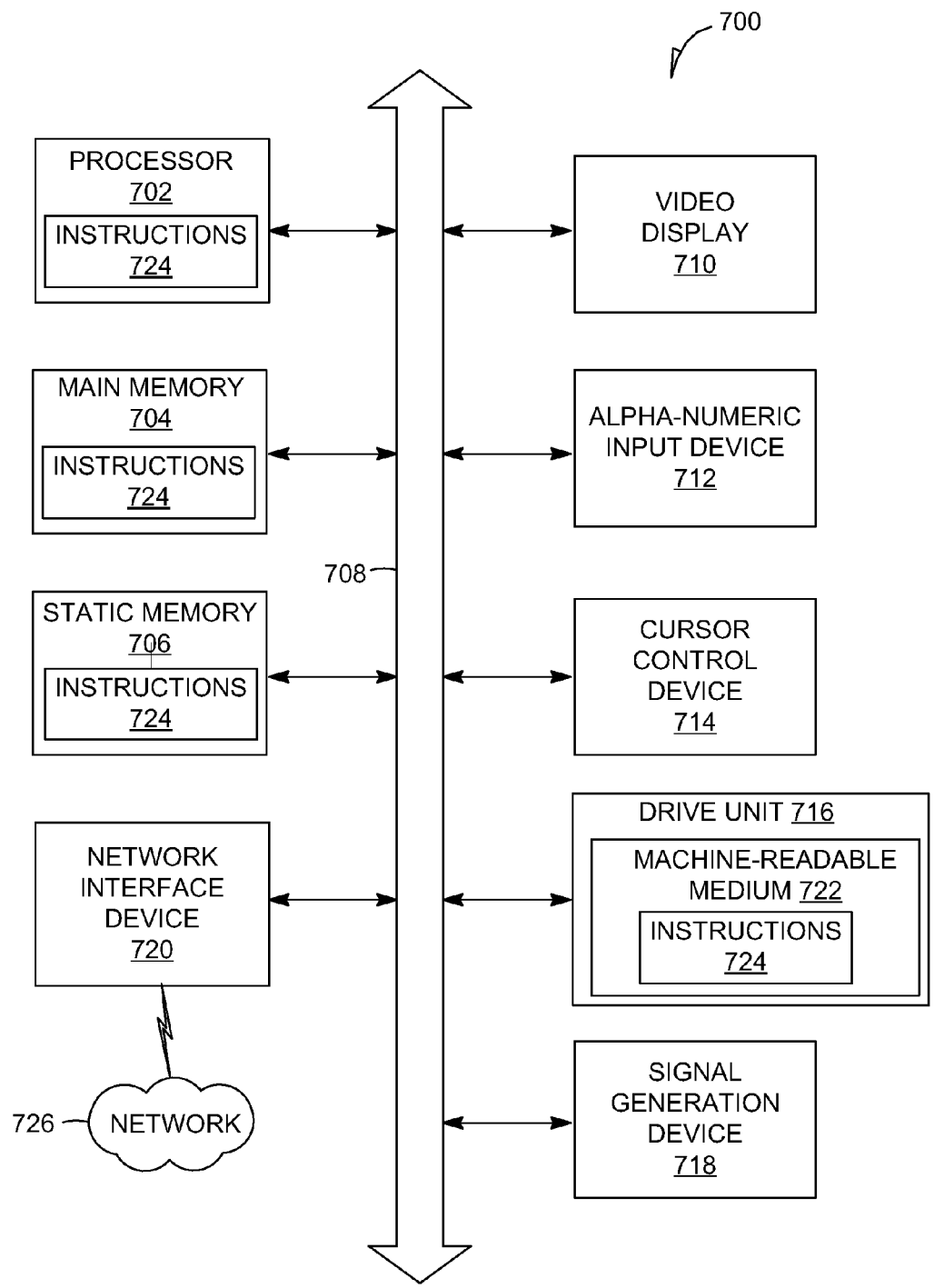
FIG. 7 is a simplified block diagram of a machine in an example form of a computing system within which a set of instructions for causing the machine to perform any one or more of the methodologies discussed herein may be executed.

With reference to FIG. 7, an example embodiment extends to a machine in the example form of a computer system 700 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 may include a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). In example embodiments, the computer system 700 also includes one or more of an alphanumeric input device 712 (e.g., a keyboard), a user interface (UI) navigation device or cursor control device 714 (e.g., a mouse), a disk drive unit 716, a signal generation device 718 (e.g., a speaker), and a network interface device 720.

Machine-Readable Medium

The disk drive unit 716 includes a machine-readable storage medium 722 on which is stored one or more sets of instructions 724 and data structures (e.g., software instructions) embodying or used by any one or more of the methodologies or functions described herein. The instructions 724 may also reside, completely or at least partially, within the main memory 704 or within the processor 702 during execution thereof by the computer system 700, with the main memory 704 and the processor 702 also constituting machine-readable media.

While the machine-readable storage medium 722 is shown in an example embodiment to be a single medium, the term "machine-readable storage medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

Transmission Medium

The instructions 724 may further be transmitted or received over a communications network 726 using a transmission medium via the network interface device 720 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
receiving an initial query term set;
based on the initial query term set determining a list of item categories that each represent a category of items available on a network;
causing the list of item categories to be presented in a user interface to a user;
receiving from the user, a selection of an item category from the list of item categories determined based on the initial query term set;
performing phrase recognition on the initial query term set to determine recognized phrases;
determining a synonym for each of the recognized phrases based on the user selected item category, the synonym comprising a plurality of words;
causing the determined synonyms to be presented in the user interface to the user along with corresponding first selectors and corresponding second selectors, each of the first selectors being operable to select the corresponding synonym, each of the second selectors being operable to select a search option for the corresponding synonym, each second selector including:

a first search option operable to cause the corresponding synonym to be matched whenever the plurality of words of the synonym are matched without regard to order,
a second search option operable to cause the corresponding synonym to be matched whenever at least one of the plurality of words of the synonym is matched, and
a third search option operable to cause the corresponding synonym to be matched whenever the plurality of words of the synonym are matched in order;
receiving, from the user, a selection of a subset of the presented synonyms selected by the user from the determined synonyms, the selection indicating corresponding search options selected by the user; and
determining, using one or more processors, results within the user selected item category that match the initial query term set and the selected subset of synonyms, the results being based on the selected search options for the selected subset of synonyms.

2. The method of claim 1, further comprising returning an entire tree for each item category of the list of item categories based on the initial query term set from which the selection of the item category is made.

3. The method of claim 1, wherein the performing of the phrase recognition comprises adding one word at a time to a blank phrase until a matching recognized phrase is found.

4. The method of claim 1, wherein the performing of the phrase recognition comprises removing One word at a time from the initial query term set until a matching recognized phrase is found.

5. The method of claim 1, wherein the performing of the phrase recognition comprises checking if a window of a number of words constitutes a matching recognized phrase.

6. The method of claim 1, further comprising:
analyzing a number of the results to determine terms most frequently encountered in the number of the results;
receiving a refinement input based on the terms most frequently encountered; and refining the results based on the refinement input.

7. The method of claim 6, wherein the refinement input comprises a term of the terms most frequently encountered to exclude from the results when refining the results.

8. The method of claim 1, wherein the item category is associated with a good or service.

9. The method of claim 1, wherein the list of item categories comprises a top number of most commonly viewed categories corresponding to the initial query term set.

10. A system comprising:
a processor of a machine;
a query tool module to receive an initial query term set;
a category identification module configured to:
  determine a list of item categories that each represents a category of items available on a network based on the initial query term set, and receive, from a user, a selection of an item category from the list of item categories determined based on the initial query term set, the selection being received via a user interface presenting the list of items to the user;
a synonym lookup module configured to perform phrase recognition on the initial query term set to determine a recognized phrase and to determine a synonym for the recognized phrase based on the user selected item category, the synonym comprising a plurality of words;
the query tool module being further configured to receive from the user a selection of the determined synonym along with a search option for the synonym, the search option comprising one of:
  a first search option requesting that the synonym to be matched whenever the plurality of words of the synonym are matched without regard to order,
  a second search option requesting that the synonym to be matched whenever at least one of the plurality of words of the synonym is matched, and
  a third search option requesting that the synonym to be matched whenever the plurality of words of the synonym are matched in order; and
a listing finder module configured to determine, using the processor, results within the user selected item category that match the initial query term set and the synonym, the results being based on the search option for the synonym.

11. The system of claim 10, wherein the listing finder module is further to analyze a number of the results to determine terms most frequently encountered in the number of the results, to receive a refinement input based on the terms most frequently encountered, and to refine the results based on the refinement input.

12. A non-transitory machine-readable storage medium in communication with at least one processor, the machine-readable storage medium storing instructions which, when executed by the at least one processor, perform operations comprising:
receiving an initial query term set;
based on the initial query term set, determining a list of item categories that each represent a category of items available on a network;
causing the list of item categories to be presented in a user interface to a user;
receiving, from the user, a selection of an item category from the list of item categories determined based on the initial query term set;
performing phrase recognition on the initial query term set to determine recognized phrases;
determining one or more synonyms for each of the recognized phrases based on the user selected item category, each of the one or more synonyms comprising a plurality of words;
causing the determined synonyms to be presented in the user interface to the user along with corresponding first selectors and corresponding second selectors, each of the first selectors being operable to select the corresponding synonym, each of the second selectors being operable to select a search option for the corresponding synonym, each second selector including:
  a first search option operable to cause the corresponding synonym to be matched whenever the plurality of words of the synonym are matched without regard to order,
  a second search option operable to cause the corresponding synonym to be matched whenever at least one of the plurality of words of the synonym is matched, and
  a third search option operable to cause the corresponding synonym to be matched whenever the plurality of words of the synonym are matched in order;
receiving, from the user, a selection of a subset of the presented synonyms selected by the user from the determined synonyms, the selection indicating corresponding search options selected by the user; and
determining, using one or more processors, results within the user selected item category that match the initial query term set and the selected subset of synonyms, the results being based on the selected search options for the selected subset of synonyms.

13. The machine-readable storage medium of claim 12, wherein the performing of the phrase recognition comprises adding one word at a time to a blank phrase until a matching recognized phrase is found.

14. The machine-readable storage medium of claim 12, wherein the performing of the phrase recognition comprises removing one word at a time from the initial query term set until a matching recognized phrase is found.

15. The machine-readable storage medium of claim 12, wherein the performing of the phrase recognition comprises checking if a window of n words constitutes a matching recognized phrase.

16. The machine-readable storage medium of claim 12, wherein the method further comprises
- analyzing a number of the results to determine terms most frequently encountered in the number of the results;
- receiving a refinement input based on the terms most frequently encountered; and
- refining the results based on the refinement input.

17. The machine-readable storage medium of claim 16, wherein the refinement input comprises a term of the terms most frequently encountered to exclude from the results when refining the results.

18. The machine-readable storage medium of claim 12, wherein the determining of the results further comprises applying an advanced query syntax input.

\* \* \* \* \*

UNITED STATES PATENT AND TRADEMARK OFFICE
CERTIFICATE OF CORRECTION

PATENT NO. : 8,949,265 B2  
APPLICATION NO. : 12/718929  
DATED : February 3, 2015  
INVENTOR(S) : Mauge' et al.

Page 1 of 1

It is certified that error appears in the above-identified patent and that said Letters Patent is hereby corrected as shown below:

In the Claims

In column 12, line 48, in Claim 1, delete "set" and insert --set,--, therefor

In column 12, line 53, in Claim 1, delete "receiving" and insert --receiving,--, therefor In column 13, line 28, in Claim 4, delete "One" and insert --one--, therefor In column 13, line 38, in Claim 6, after "and", insert --¶--, therefor In column 15, line 14, in Claim 16, after "comprises", insert --:--, therefor Signed and Sealed this  
Fourth Day of August, 2015

Michelle K. Lee  
*Director of the United States Patent and Trademark Office*